UNITED STATES PATENT OFFICE.

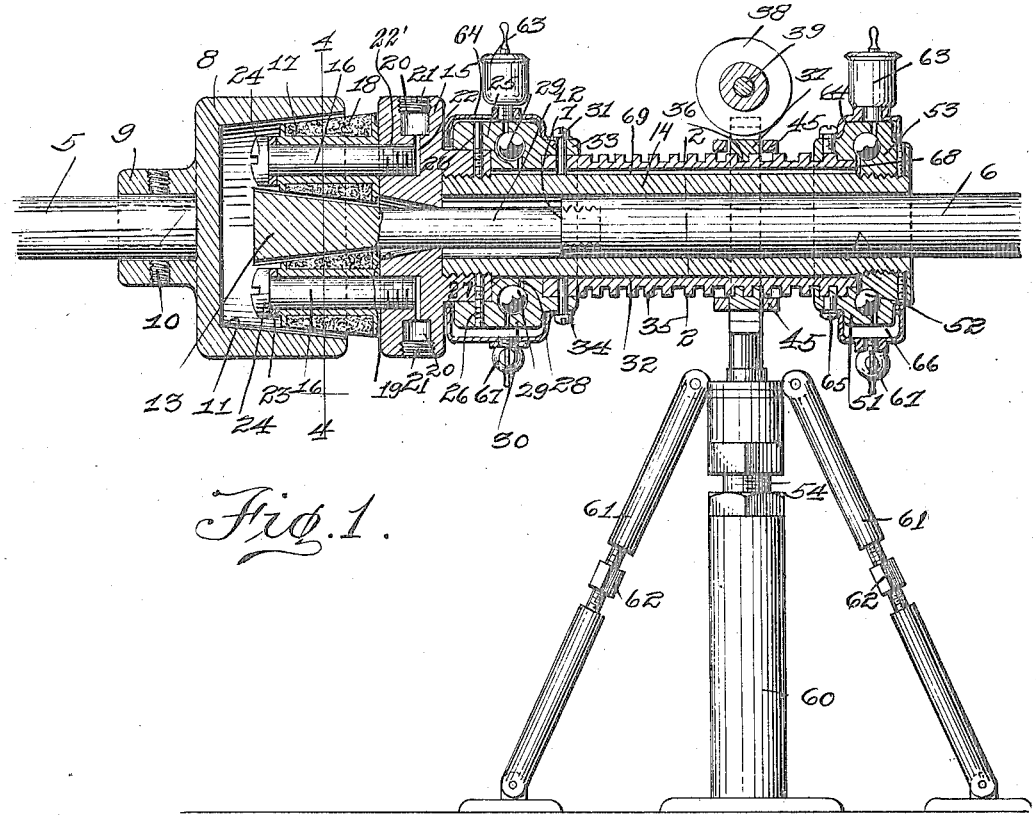

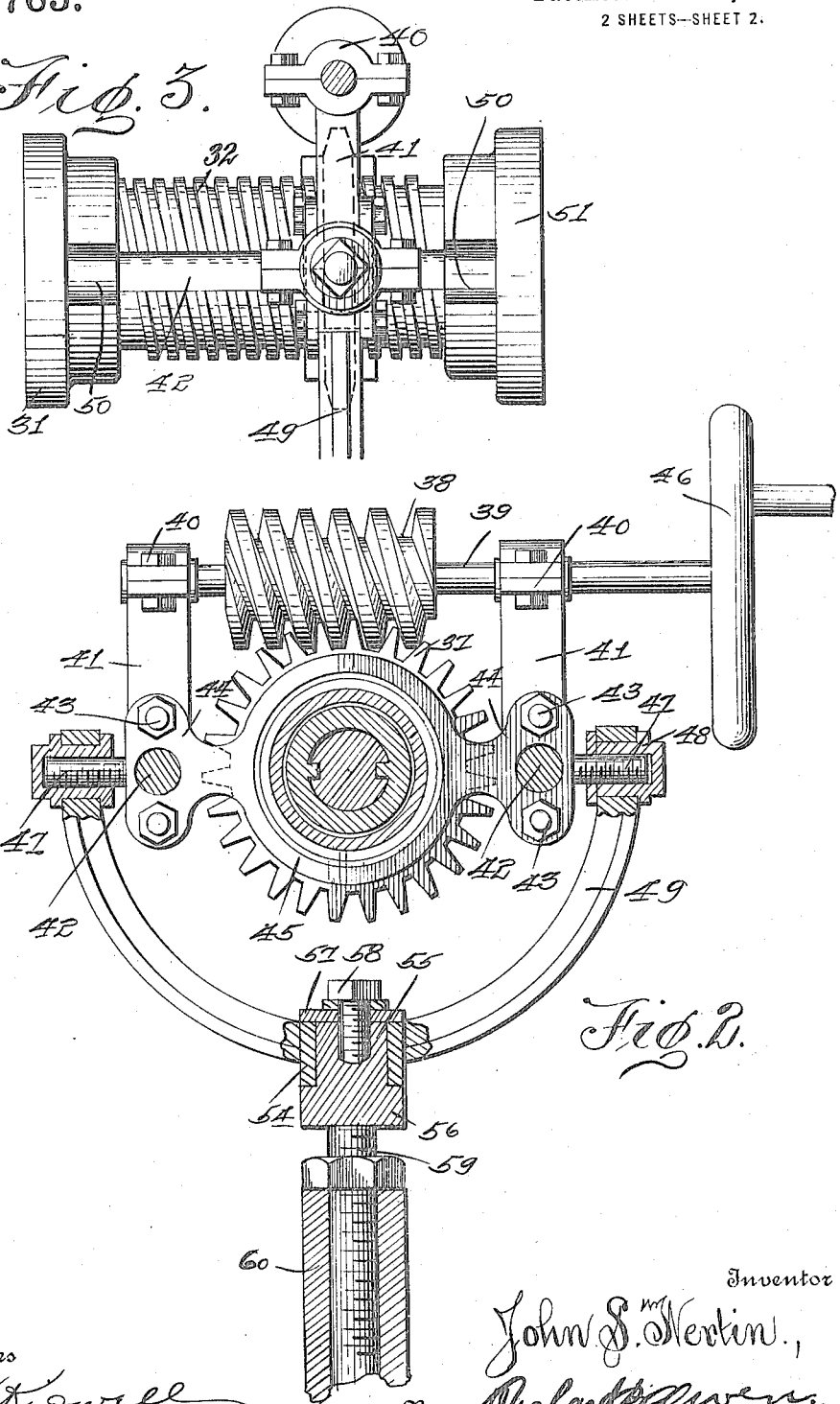

JOHN S. WERTIN, OF COKEDALE, COLORADO.

FRICTION-CLUTCH FOR SHAFTS.

1,269,765. Specification of Letters Patent. Patented June 18, 1918.

Application filed December 23, 1914. Serial No. 878,779.

*To all whom it may concern:*

Be it known that I, JOHN S. WERTIN, a citizen of the United States, residing at Cokedale, in the county of Las Animas and State of Colorado, have invented certain new and useful Improvements in Friction-Clutches for Shafts, of which the following is a specification.

This invention relates to shaft clutches and is more particularly concerned with a friction clutch for gradually uniting a driving shaft to a driven shaft.

As a principal object, this invention contemplates the provision of a clutch of the type set forth which shall absorb all shocks incident to the coupling of a driven shaft with a previously stationary shaft whose inertia resists the motion imparted by such coupling and to also provide a clutch which is incapable of causing a sudden engagement between the mentioned shafts.

A further object is to provide means including a worm, its meshing worm wheel and a threaded cylinder, movement of which is governed by the latter, which may be manually manipulated to cause the gradual engagement of a pair of shafts equipped with a friction clutch of this character, such operating mechanism being readily controllable to disengage the portions of the clutch when it is desired to thoroughly inspect the same.

A still further object is to provide a group of rollers in a clutch of the mentioned type which shall receive the primary frictional pressure of the clutch engagement without immediately transmitting the same to the stationary shaft but which shall also be capable of gradually effecting such transmission in full.

It is an object of equal importance to provide a novel hanger for the clutch and its operating mechanism which shall always tend to occupy the necessary alined position with respect to the shafts in which only there is to be found complete absence of torsional strain and side thrust thereupon, means also being provided for adjusting this hanger and the mechanism supported thereby with respect to each other.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice and throughout the several views of which like characters of reference designate similar parts:

Figure 1 is a longitudinal sectional view taken entirely through the clutch members and their adjuncts as comprising the frictional clutch of the invention, Fig. 2 is an enlarged transverse sectional view taken on the line 2—2 of Fig. 1, Fig. 3 is a detail elevation of a portion of the matter disclosed in Fig. 1, and Fig. 4 is a transverse sectional view taken on the plane indicated by the line 4—4 of Fig. 1, and enlarged.

In the application of the friction clutch of this invention to a driving and a driven shaft, these latter may be considered to be denoted by the numerals 5 and 6 respectively. These shafts are axially alined and their adjacent extremities are spaced from each other. The end 7 of the driving shaft 5 is adapted to carry a socket jaw 8 which is keyed upon its shaft and includes the supporting stem 9, provided with suitable threaded apertures 10 for the reception of set screws (not shown) whereby the jaw is maintained upon its shaft, the head of the jaw being formed with the frusto-conical recess designated by the numeral 11 and adapted to receive the mating portion of the opposite clutch member.

Into the extremity of the driven shaft 6 there is threaded the shank 12 of the friction block 13, which is pyramidal in form with its sides hollowed out to embrace a considerable area of the rollers 17 when frictionally engaged therewith and oppositely disposed as regards the recess 11, the head tapering toward its inner end with the taper corresponding to the angle of the wall of the mentioned recess 11. There is splined upon this shaft 6 the cylindrical member 14, being adapted to rotate therewith and also adapted for longitudinal sliding movement thereon, such member being threaded upon both of its extremities and receiving upon its clutch end, the chuck 15, to which are secured shafts 16 in the manner clearly shown in Fig. 4, at the extremities of perpendicular diameters of said chuck and being grouped around the mentioned friction block 13. Each of these shafts 16 is adapted to carry a friction roller 17 having a suitable metallic core provided with annular terminal flanges between which there is seated preferably the fiber envelop 18 surrounding such core. It is to be noted that these rollers are also of a pyramidal formation and are of such size as to enter into simultaneous contact with the jaw 8 and the friction head 13, the latter of which is formed with suitable concaved surfaces for holding such rollers and of a concentric curvature therewith to enable the head to perform the function of a brake upon each of these rollers as will be hereinafter more fully set forth.

The chuck 15 is formed with the central aperture 19 and with the peripherally located grease cups 20 provided with suitable closures 21 and with communicating ducts 22 leading to the terminus of the shafts 16, it being understood that the ducts 23 connect with the small oil ducts 22' formed in the chuck 15 and extending longitudinally of said shafts 16, thereby thoroughly lubricating the latter and assuring free rotation of said rollers 17 upon said shafts 16. These shafts 16 are provided with exterior retaining means 23 and removable cap screws 24 which prevent dislodgment of the rollers 17 from their shafts 16 in the manner obviously necessary.

Since the operating mechanism for effecting longitudinal movement of the cylinder 14 with relation to the shaft 6 is necessarily stationary and since this shaft is adapted to rotate, bearings must necessarily be supplied between these separate parts of the clutch. These bearings include at one end of the cylinder a rotatable member 25 which is secured by set screws 26 extending through the annular flange 27 of the chuck 15 and into engagement with the threaded extremity of the cylinder 14. A ball race is formed in one face of this rotatable bearing, such race including an integral and outwardly extending ball cage 28 projecting beyond the ball bearings 29 which are mounted in such race, this cage together with the similar cage 30 of the stationary member 31 being adapted to sustain the thrust which would otherwise be drawn entirely upon the balls 29. The stationary bearing member 31 is adapted to abut the adjacent extremity of the guiding cylinder 32, being formed with the annular socket portion 33 overlying the said cylinder end and secured to the latter by means of suitable screws 34.

The cylindrical operating member 32 is provided with the square screw threads 35 with which there is adapted to mesh the similarly formed threads 36 carried interiorly of the worm wheel 37 in the manner illustrated, such worm wheel being adapted to mesh with an operating worm 38 mounted on its shaft 39 as more particularly illustrated in Fig. 2. This shaft 39 is mounted in the split bearings 40, which latter are transversely alined with respect to the longitudinal axis of the clutch and which are provided with the downwardly extending portions 41, similarly apertured to receive the outwardly rigged shafts 42, and the bolts 43 which secure the ears 44 of annular guard plates 45, such guards being positioned as shown in Fig. 1 on either side of the gear wheel and surrounding the cylinder 32 in order to prevent longitudinal motion of the former with respect to the latter when the worm wheel 38 is operated. The worm wheel shaft 39 is extended through one of the split bearings 40 and carries the hand wheel 46 at its extended extremity in order to provide a ready means for manually manipulating the worm in its adjuncts. The bearing portions 41 are formed with outwardly extending threaded pins 47 at their lower extremities which are received in the suitably threaded sockets 48 carried at the extremities of the substantially U-shaped bracket 49 serving to mount the clutch mechanism. The shafts 42 above mentioned are supported in bosses 50 carried laterally of the non-rotatable bearing portion 31 and by the similarly formed bearing portions 51 carried at the opposite extremity of the cylinder 32 and like the first mentioned bearing provided with the antifriction balls 52 which are interposed between said cylinder 32 and a rotatable bearing member 53 connected to the outermost threaded extremity of the cylinder 14.

The U-shaped mounting 49 for the clutch mechanism is provided with a central and integral eye 54 through which is received the stem 55 of the hanger member proper 56 in such manner as to effect what is practically a swivel joint between the hanger and the mounting 49. A washer 57 and securing nut 58 prevent displacement of the U-shaped portion with respect to the stem 55. A threaded shank 59 is carried by the hanger portion 56 for reception in the interiorly threaded base portion 60 in order to afford the hanger an obvious vertical adjustment. Side braces 61 may also be provided for the central hanger and be adjustable therewith by means of an obvious turn buckle movement 62.

As a means of lubricating the bearing members and the ball races there are provided the oil cups 63, each of which is supported immediately over the ball race in the oil guards 64 which are secured as indicated at 34 and 65, respectively, to the non-rotatable bearing members. Each of these oil guards surrounds the rotatable member of one of the bearings and has its non-secured edge bent up to form a gutter to prevent waste of the oil and conducting the same to the lower portion indicated at 66 from which the superfluous oil may be drained off in pet cocks 67. Oil passages 68 between the members 51 and 53 lead from the ball races to a communicating oil channel 69 whereby the lubricating material is conducted to various points of use as illustrated. Should the oil gathering in the lower part of each oil guard not be drained off through the cock 67, it will be obvious that the rotating bearing members 25 and 53 respectively will gather up a portion of this oil and cause the same to be employed in lubricating the movable parts of the device.

In operation, considering the shaft 5 to be driven, if it is desired to drive the shaft 6 therefrom the hand wheel 46 is so turned as to operate the worm 38 and consequently the worm wheel 37 which will then have a tendency to travel upon its meshing cylinder member 32 but which will be prevented from longitudinal movement thereupon by means of the mentioned stops or guards 45, so that such movement will be transmitted directly to the member 32 in order to longitudinally shift the entire mechanism with relation to the shaft 6 and to the jaw 8. Upon the first contact with the walls of the recess 11 by the rollers 18, a tendency will be given these to rotate, which tendency will be checked or braked by the friction head 13, as these rollers are pushed forwardly into contact with such head, which is of course stationary with respect to the clutch mechanism proper. As the engaging movement of the hand wheel 46 is increased, it will be obvious that the brake power exerted by this head will also increase as will the frictional pressure between the rollers and the jaw member and it will be apparent from a perusal of the foregoing description in connection with the drawings and particularly with Fig. 1 that the rotation of the shock absorbing cones 18 will gradually be lessened until they are forced into a tight engagement with both the jaw and the head member enabling the movement of the former to be transmitted to the latter which will of course effect the desired rotation of the shaft 6.

It will be seen that the engaging movement is very gradual and that no shocks to the driven shaft are transmissible through this clutch due to the sudden strain of the load deposited thereupon and it should therefore be apparent that means have been disclosed as comprehended by this invention whereby the previously presented objects may be attained so that this invention may therefore be claimed as possessing the advantages and desirability set forth in such objects.

While in the foregoing however, there has thus been illustrated in the drawings and described in the specification, such combination and arrangement of elements as constitute the preferred embodiment of this invention, it is desired to emphasize the fact that such minor changes in the matter of proportion and degree may be made in later adaptations of this device as shall not alter the spirit of the invention as defined in the appended claims.

What is claimed is:

1. In a friction clutch of the type described, the combination with a pair of alined shafts spaced from each other, of a coned socket member carried by one of said shafts, a friction head carried by the other of said shafts, a chuck surrounding said head, coned rollers rotatably mounted on said chuck, means rotatably mounting said chuck on said head, and means for effecting a longitudinal movement of both said chuck and said rollers.

2. In a friction clutch of the type described, the combination with a pair of alined shafts spaced from each other, of a socket member carried by one of said shafts, a coned friction head carried by the other of said shafts, a chuck surrounding said head, coned rollers rotatably mounted on said chuck and adapted to establish a contact between said socket member and said head, means rotatably mounting said chuck, and means for moving said chuck and said rollers to establish the contact between said socket member and said head.

3. In a friction clutch of the type described, the combination with a pair of alined shafts spaced from each other, of a socket member carried by one of said shafts and provided with a conical recess, a friction head carried by the other of said shafts and provided with an oppositely disposed conical portion projecting into said recess, a chuck surrounding said head, means effecting a longitudinal movement of said chuck with respect to said head and said second shaft, and rollers carried by said chuck for interposition between said head and said socket member and capable of an independent rotation with respect to said chuck.

4. A friction clutch of the type described including, in combination, a pair of shafts spaced from each other, a conically recessed socket member carried by one of said shafts, a conically formed friction head carried by the other of said shafts and disposed within said socket member, a cylindrical member splined on said second shaft, a chuck carried by said member, coned rollers carried by said chuck and adapted to be interposed between said friction head and said socket member to effect a gradual engagement of said shaft, and means for manually causing longitudinal movement of said cylindrical member to effect such movement of interposition.

5. A friction clutch of the type described including, in combination, a pair of alined shafts spaced from each other, a conically recessed socket member carried by one of said shafts, an oppositely formed conical friction head carried by the other of said shafts and extending into said recess, a cylindrical member splined upon said second shaft, a chuck carried by said cylindrical member, coned rollers carried by said chuck, bearing portions secured to said chuck and said cylindrical member and adapted to rotate therewith, complementary bearing portions to the first said portions but adapted to remain stationary, a threaded cylinder secured to said second named bearing portions, and driving means including a manually operable worm and its wheel for effecting longitudinal motion with respect to said second shaft of said chuck.

6. In a friction clutch of the type described, the combination with a pair of alined shafts spaced from each other, of a socket member carried by one of said shafts and provided with a conical recess, a friction head carried by the other of said shafts, rollers mounted around said head, and means for effecting longitudinal movement of said rollers with respect to the second-mentioned shaft to lock said head with said socket member.

7. In a friction clutch of the type described, the combination with a pair of alined shafts spaced from each other, of a socket member carried by one of said shafts, a friction head carried by the other of said shafts, rollers mounted upon the last-mentioned shaft and surrounding said head, and means for moving said rollers longitudinally upon said shaft to lock said head with said socket member.

8. A friction clutch of the type described including in combination, a pair of shafts spaced from each other, a conically recessed socket member carried by one of said shafts, a conically formed friction head carried by the other of said shafts, cone shaped rollers surrounding said head, means for mounting said rollers upon the second-mentioned shaft, and means for moving said rollers longitudinally of said shaft to carry said rollers to position between said friction head and said socket member to effect a gradual engagement of said shafts.

9. The combination with drive and driven shafts, of a hollow clutch member carried by the drive shaft, a clutch block carried by the driven shaft, said block being pyramidal in form and having its sides hollowed out to provide radially arranged recesses, a member longitudinally movable on the driven shaft, conical rollers carried by the longitudinally movable member and engageable between the recesses in said block and the hollow clutch member, and means for shifting the member longitudinally to cause the cones to frictionally engage the block and hollow clutch member.

10. The combination with drive and driven shafts, of a hollow clutch member carried by the drive shaft, a tapered block carried by the driven shaft, a sleeve mounted on the driven shaft and longitudinally movable thereon, cones carried by the sleeve, said cones being tapered in the direction opposite to the inclination of the tapered block, gear-teeth formed on the sleeve, and a gear meshing with said teeth and operable to effect sliding movement of the sleeve.

11. The combination with a drive shaft and a driven shaft, of a hollow clutch member carried by the drive shaft, a sleeve mounted on the driven shaft, a chuck carried by said sleeve, a second sleeve longitudinally movable on the driven shaft and connected to said first sleeve, clutch elements carried by said chuck and adapted for frictional engagement with the hollow clutch member, and means for shifting the longitudinally movable sleeve to cause the frictional engagement of the clutch elements with the first named clutch member.

12. The combination with a drive shaft and a driven shaft, of a hollow clutch member carried by the drive shaft, a sleeve mounted on the driven shaft, bearing plates carried by the sleeve, a second sleeve longitudinally movable on the driven shaft, bearing plates carried by the ends of the latter sleeve and coöperating with the other bearing plates, antifriction means between the coöperating plates, a chuck carried by said first sleeve, a plurality of friction rollers carried by said chuck to establish a driving connection between said driving and driven shafts and means for moving said sleeve to engage the roller with the hollow clutch member.

13. The combination with drive and driven shafts, of a hollow clutch member carried by the drive shaft, a block carried by the driven shaft, a chuck movable along said driven shaft, friction rollers carried by said chuck and insertible between said block and the hollow clutch member, a threaded sleeve operatively connected with said chuck and movable along said driven shaft, a worm wheel surrounding said sleeve and threadedly engaged therewith, a support including bearing arms, a worm supported between said arms and meshing with the worm wheel surrounding said sleeve, and means for operating said worm.

14. The combination with drive and driven shafts, of a hollow clutch member carried by the drive shaft, a chuck movable along said driven shaft, rollers carried by said chuck and engageable with said hollow clutch member, a threaded sleeve movable along the driven shaft and connected with said chuck, a worm wheel surrounding said sleeve and having threaded engagement therewith, a support including bearing arms, a worm supported between said arms and meshing with said worm wheel, means for actuating said worm to rotate said worm wheel, and means for holding said worm wheel against longitudinal travel along said driven shaft.

15. The combination with drive and driven shafts, of a hollow clutch member carried by the drive shaft, a threaded sleeve movable along the driven shaft, a chuck movable with said sleeve, a plurality of rollers carried by said chuck and engageable with said hollow clutch member, a worm wheel surrounding said sleeve and having threaded engagement therewith, means for holding said worm wheel against traveling movement with respect to the length of said sleeve and driven shaft, and means for rotating said worm wheel, to impart sliding movement to said sleeve for the purpose of engaging and disengaging said rollers with the hollow clutch member.

16. The combination with drive and driven shafts, of a hollow clutch member carried by the drive shaft, a second clutch member slidably arranged on the driven shaft and engageable with the hollow clutch member, a threaded sleeve movable along the driven shaft and operatively connected with the clutch member thereon, a worm wheel surrounding said sleeve and threadedly engaged therewith, said wheel adapted upon being rotated to cause sliding movement of said sleeve, a support, including bearing arms, a worm supported between said arms and meshing with the worm wheel surrounding said sleeve, means for actuating said worm to rotate said worm wheel, and plates carried by said support and engaged with opposite sides of the worm wheel to prevent said wheel from traveling longitudinally of said sleeve and driven shaft.

In testimony whereof I affix my signature in presence of two witnesses.

JOHN S. WERTIN.

Witnesses:
FRED H. SPAHY,
JOHN W. HOLMES.

Copies of this patent may be obtained for five cents each, by addressing the "Commissioner of Patents, Washington, D. C."